3,606,362
SEALING WASHERS
Sydney J. Wainstein and Bernard M. Sherman, Johannesburg, Transvaal, Republic of South Africa, assignors to National Plant Hire (Proprietary) Limited, Jeppe, Johannesburg, Transvaal, Republic of South Africa
Filed Dec. 20, 1968, Ser. No. 785,627
Int. Cl. F16j 15/00
U.S. Cl. 277—235          7 Claims

ABSTRACT OF THE DISCLOSURE

A sealing washer assembly for the retention of cladding material to building frames and particularly roof structures consisting of the combination of a metal outer washer with a resilient liner wherein the two parts are held together by resilient engagement of a part of the liner with a suitable edge portion of the metal washer.

---

This invention relates to sealing washer assemblies basically intended to seal the openings made by or for roof fixing screws and the like, but not confined to this purpose.

It is the object of the present invention to provide a sealing washer of the above type which is not only inexpensive to manufacture but which is also easily used with a minimum loss or wastage of parts of the assemblies and also efficient in obtaining a satisfactory degree of sealing.

According to this invention there is provided a sealing washer assembly comprising a metal washer having attached thereto a centrally perforated resilient liner with the perforation passing through a portion forming a projection from the liner and with the attachment effected by engagement of the resilient material with an edge on the metal washer.

The invention also provides for the washer assemblies to be provided as mats of assemblies interconnected by thin strips of the resilient material or easily fractured webs of metal.

Further features of this invention provide for an assembly comprising a metal washer of domed or frustoconical shape enclosing a centrally perforated plastic liner having a centre portion of substantially greater thickness than the edge portion thereof, and with the centre portion of the metal washer engaging in an annular wasted portion in the plastic liner.

It is understood that the term "metal washer" is used in its widest sense as indicating a perforated plate whether circular or otherwise and whether curved or flat.

Further features of this invention will become apparent from the following description of some preferred embodiments of this invention and particularly to the engagement of the head on the plastic liner with cladding material with which the washer assembly is used.

These embodiments are illustrated in the accompanying drawings in which.

Figure 1:
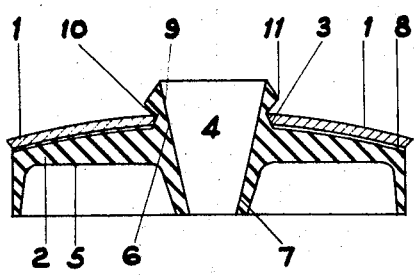
FIG. 1 is a sectional view of one form of assembly

In FIG. 1, which is on a slightly larger scale than the remaining figures, a part spherical washer 1 made of steel or like relatively rigid material is provided with a resilient liner 2 of plastics material.

Each liner 2 has a central hole 3 of smaller bore 4 than that in the metal washer 1. The bottom 5 of each liner 2 is generally dished in the same direction as the metal washer but to a lesser extent so that the centre portion 6 of the liner is of substantial thickness. The centre portion 6 of the bottom of the liner is also preferably coned downwardly as shown at 7.

The top of each liner is extended as a centrally perforated head 9 joined to the remainder of the liner by a wasted portion 10. The upper surface 11 of the wasted portion 10 is bevelled at an angle to extend over the adjacent annular portion of the steel washer 1.

In the assemblies the steel washers are attached to the corresponding plastic liners by pressing the two members together, the plastic having sufficient flexibility to allow the perforated portion of the steel washer 1 to ride over the head 9 of the liner and engage the wasted portion 10.

Figure 7:
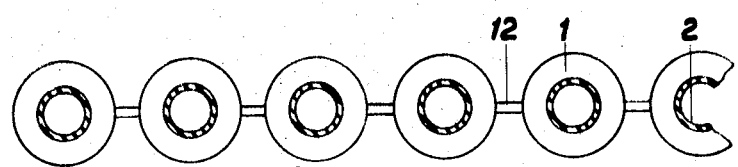

Instead of making the liners separately and thereafter attaching them to the metal washers the liners may be moulded directly into the metal washers 1 the centre portions of which will form and be embedded in the wasted portions 10 of the liners 2. If desired in this embodiment, the metal washers may be punched with easily breakable webs 12 (see FIG. 7) to form a pad of assemblies.

Figure 6:
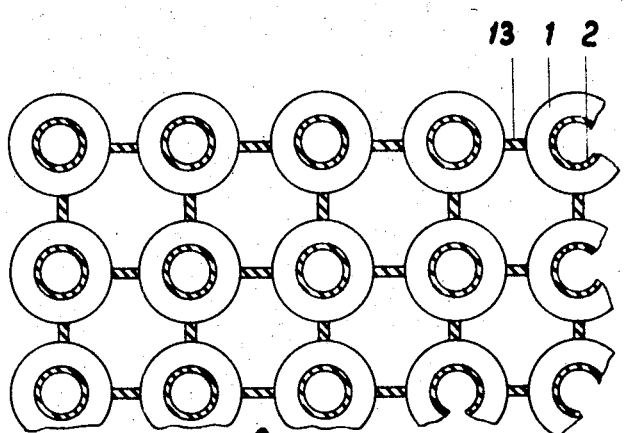
FIGS. 6 and 7 illustrate two different pads of assemblies.

The pads of assemblies may be made with the plastic liners on mats of either long strips of single in line liners or blocks of such liners with each one connected to at least one or more similar liners. The connection is effected by thin strips 13 of plastic material (see FIG. 6).

The metal washers will then be fitted to these liners so that they may be either manipulated or mechanically handled for use as required without having to be assembled or dealt with individually.

In the alternative arrangements shown in FIGS. 2 to 5 parts will be similarly numbered to the equivalent parts in FIG. 1 where this is applicable.

Figure 2:
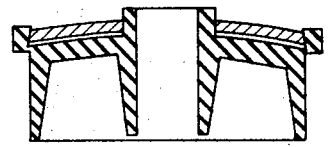
FIGS. 2 to 5 show alternative assemblies.
Figure 3:
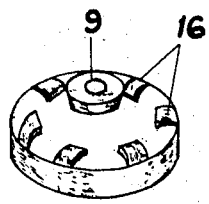

In FIG. 2 the metal washer 1 is resiliently engaged around its outer periphery 14 by a rib 15 upstanding from the outer edge of the plastic liner 2. Alternatively as shown in FIG. 3 the rib 15 may be interrupted to form a series of lugs 16 which engage the edge in a similar manner.

In another arrangement the central bore through the washer is gripped in a similar manner by a rib formed above the wasted portion 10 in FIG. 1 or this rib may be divided into a series of lugs formed on the head moulded into the liner.

Figure 5:
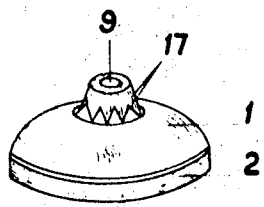

Also as shown in FIG. 5 the head 9 may be formed with ribs 17 extending along the head above the upper surface of liner 2 substantially parallel to the axis of the latter. These ribs 17 may taper inwardly towards the free end of the perforated head 9.

Figure 4:
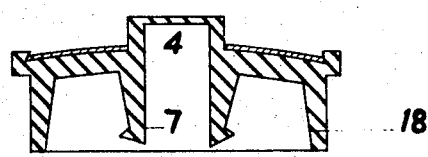

FIG. 4 is included to show an alternative shape 18 to the lower inwardly coned portion 7 of the liner 2 and it will be appreciated that various combinations of the embodiments illustrated can be used.

In use to secure, for example, a corrugated iron or predrilled asbestos cement roofing sheets in position a washer according to this invention is fitted on a roofing screw which is then hammered into position. As the screw is hammered inwardly the head 9 of the liner 2 will be squeezed between the head of the screw and the metal washer. This will cause this portion of the liner to deform and be pressed into sealing engagement with the shank of the screw.

The amount of deformation will be limited by the screw head compressing the plastic against this edge.

Also the downward pressure applied to the liner will tend to cause the bottom coned portion 7 to press into the predrilled hole, or the hole formed by the screw, to improve the sealing effected by the bottom surface of the liner.

It is considered that a further improvement in effectiveness of sealing may be achieved by tapering the bore 4 through the liner from the head 9 to the bottom of the liner, and if desired by making the smaller diameter portion of lesser diameter than the fixing screw so that it will be stretched by insertion of the fixing screw.

Where the assemblies are provided with connecting webs these are only broken immediately prior to or during use of the washers.

Whether or not the washers are left with connecting webs they are more easily usable than known types of roofing washers and complementary sealing washers formed as separate entities.

Whether or not the liner are to be used in combination with domed or flat metal washers the top surfaces of the liners are conveniently made of upwardly domed shape, provided the liners are made sufficiently flexible to accommodate themselves to the shape of washers other than domed washers.

This flexibility is achieved by choice of plastic material from which the washers are made and/or shaping of the washer. Thus the edge portion of the liner which forms one of the sealing surfaces thereof, and is in the form of a skirt 18 may be made thin and accordingly very flexible. This skirt 18 may be of cylindrical shape of frusto-conical shape co-axial with the axis of the liner.

It is generally not necessary to vary the shape of the head of the linear to make it usable with different types of metal washers.

What we claim as new and desire to secure by Letters Patent is:

1. A sealing washer assembly comprising a metal washer of substantially domed configuration and a liner of resilient material, said liner having an axial passage therethrough and a central portion forming an annular projection from that side of the liner towards said washer, a head formed on the free end of said projection, an annular recess formed in the outer surface of said projection, said metal washer and liner being assembly with said projection passing through said washer with the inner peripheral edge of the washer engaging in said recess to hold them together solely by resilient gripping engagement between the resilient material and said peripheral edge of the washer.

2. A sealing washer assembly as claimed in claim 1, further comprising a peripheral rib extending around the outer edge of the liner on that side directed towards the washer, the outer peripheral edge of said washer resiliently engaging with said rib.

3. A sealing washer assembly as claimed in claim 2, in which said rib is interrupted to provide a series of lugs each resiliently engaging said washer.

4. A sealing washer assembly as claimed in claim 1, further comprising a plurality of resilient ribs formed on the outside of the head and extending substantially parallel to the axis of the liner, said ribs each resiliently engaging with the metal washer.

5. A sealing washer assembly as claimed in claim 1, further comprising a flexible peripheral skirt extending from the outer edge of the liner away from the washer.

6. A sealing washer assembly as claimed in claim 1, in which the central portion is extended in the direction opposite said washer as a downwardly tapering frusto-conical portion.

7. A sealing washer assembly as claimed in claim 1, in which the liner is of substantially greater thickness at the center than at the edge portion thereof and is made of plastics material.

References Cited
UNITED STATES PATENTS

| | | | |
|---|---|---|---|
| 963,060 | 7/1910 | Noppel | 277—235X |
| 2,553,750 | 5/1951 | Cole | 277—235X |
| 2,600,516 | 6/1952 | Pielop | 277—235X |
| 3,226,168 | 12/1965 | Recknagel | 277—235X |
| 3,203,304 | 8/1965 | Rapata | 277—212X |
| 3,168,321 | 2/1965 | Glicksman | 277—235X |
| 3,241,846 | 3/1966 | Peickii | 277—235 |
| 3,473,856 | 10/1969 | Helms | 277—235 |

EDWARD J. MICHAEL, Primary Examiner